United States Patent Office 2,891,100
Patented June 16, 1959

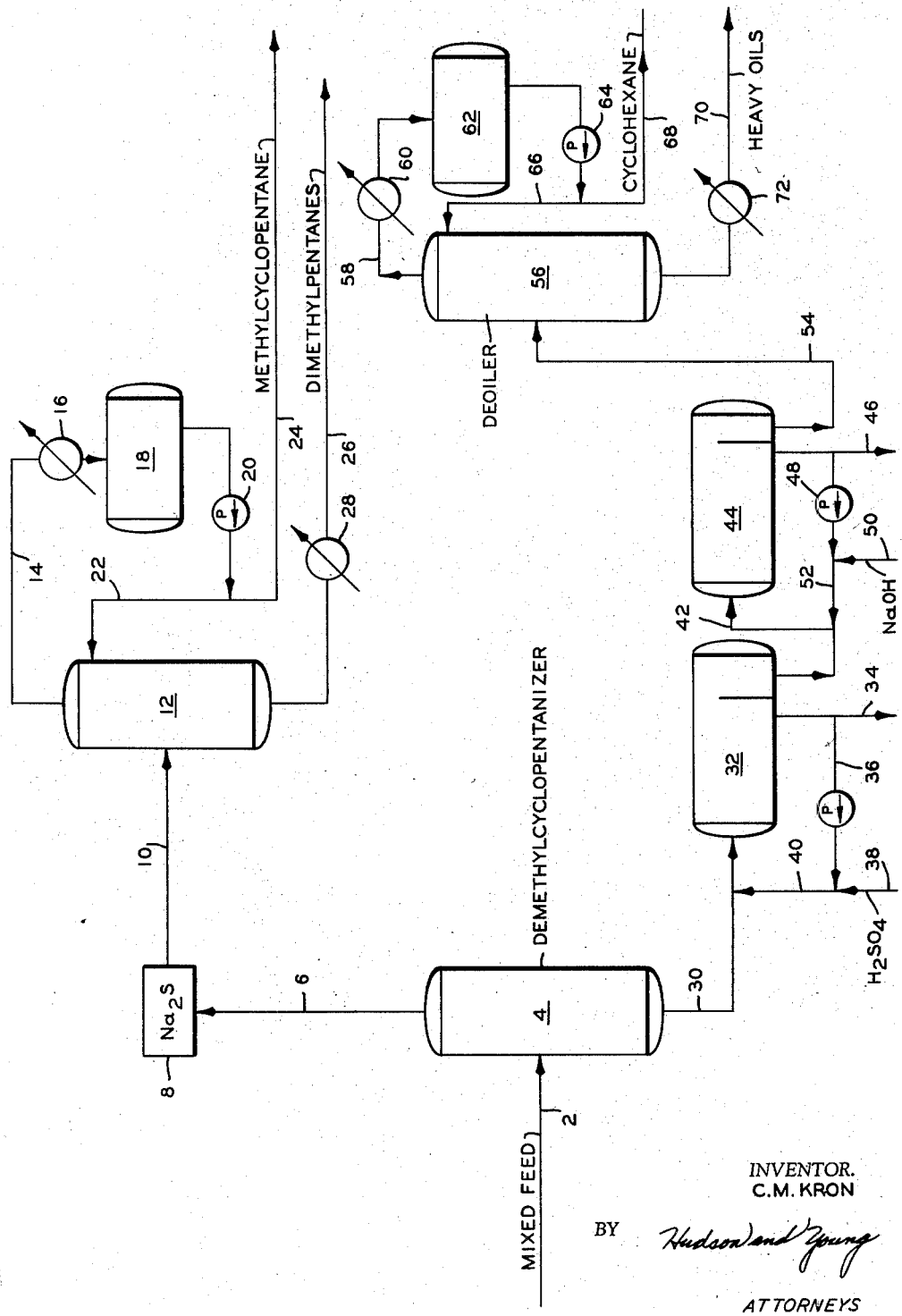

2,891,100

CYCLOHEXANE RECOVERY

Carl M. Kron, Phillips, Tex., assignor to Phillips Petroleum Company, a corporation of Delaware Application August 16, 1957, Serial No. 678,713

7 Claims. (Cl. 260—666)

This invention relates to the recovery of cyclohexane from a hydrocarbon mixture. In one aspect it relates to the recovery of cyclohexane from natural gasoline or straight run gasoline. In another aspect it relates to the recovery of cyclohexane from narrow boiling range fraction of mixed cyclic hydrocarbons containing carbon tetrachloride and sulfur compounds.

Cycloparaffins, such as cyclohexane, find wide use as solvents and as starting or intermediate materials in chemical reactions. Usually it is desirable that the cycloparaffins be available in a relatively pure state. For example, when cyclohexane is used as a solvent or diluent in the polymerization of olefins to solid polymers it is desirable that this material be free from sulfur compounds and other materials which are detrimental to the polymerization catalysts. One of the sources of cyclohexane is natural gasoline which frequently must be transported over long distances by pipeline. As an aid in the transportation of natural gasoline and to eliminate the problem of wax deposition, carbon tetrachloride is frequently added to this material. Another source of cyclohexane is straight run gasoline from crude oils. This material also frequently contains carbon tetrachloride as a result of treatment of equipment, e.g. well casings, pipelines, in the oil fields with chlorinated solvents. This invention is concerned not only with the removal of sulfur and other materials which are detrimental to the polymerization catalysts but also with the separation of cyclohexane from carbon tetrachloride, which can also act as a catalyst poison.

It is an object of this invention to provide improved process for the recovery of cyclohexane.

It is another object of this invention to provide an improved process for recovery of cyclohexane from narrow boiling range gasolines containing carbon tetrachloride.

Yet another object of this invention is to recover cyclohexane from a narrow boiling range fraction of mixed cyclics containing sulfur compounds and carbon tetrachloride.

These and other objects of the invention will become more readily apparent from the following detailed description and discussion.

The foregoing objects are realized by processing a narrow boiling range fraction of mixed cyclics from a natural gasoline containing carbon tetrachloride in a first fractionation zone wherein materials lighter than cyclohexane are removed, treating the fractionation bottoms to remove sulfur compounds and further processing the bottoms in a second fractionation zone to remove materials heavier than cyclohexane and recover a cyclohexane product free from carbon tetrachloride and sulfur compounds.

In one aspect of the invention the first fractionation zone is operated to provide an overhead product containing at least about 12 volume percent of material boiling above methylcyclopentane including at least about 4.5 volume percent cyclohexane, the acid treating is carried out utilizing an acid having a weight percent concentration of at least about 70 percent and the second fractionation zone is operated to provide an overhead product containing not more than about 11 volume percent of material boiling below cyclohexane and not more than about 6 volume percent of material boiling above cyclohexane.

Cyclohexane purified by the aforedescribed process can be used for a variety of purposes. One application is the use of this material as a diluent and solvent in the polymerization of olefins to solid polymers in the presence of chromium oxide catalyst, containing hexavalent chromium, associated with an additional or supporting material. The following discussion will be directed to this specific application however, this is not intended in any way to limit the scope of the invention, which is directed broadly to the purification and recovery of cyclohexane for any suitable purpose.

Various olefins can be converted to solid polymers including, for example, monoolefins like ethylene, propylene, butylenes, etc. Also various monoolefins can be polymerized with each other or with diolefins such as butadiene and isoprene, etc.

Solid olefin polymers are prepared usually by contacting the olefin to be polymerized with a catalyst at an elevated temperature and pressure, preferably in the presence of the solvent or diluent material. The temperature required for polymerization varies over a wide range; however, usually it is preferred to carry out the reaction at a temperature between about 150° F. and about 450° F. The particular temperature to be employed in each individual case depends on the catalyst used, the olefins to be polymerized and the operating conditions employed such as pressure, space velocity, diluent olefin ratio, etc.

The polymerization pressure is often maintained at a sufficient level to assure a liquid phase reaction, that is at least about 100 to 300 p.s.i.g., depending upon the type of feed material and the polymerization temperature. Higher pressure up to 500 to 700 p.s.i.g. or higher can be used, if desired. When utilizing a fixed catalyst bed the space velocity varies from as low as 0.1 to about 20 volumes of feed per volume of catalyst per hour, with the preferred range being between about 1 and about 6 volumes per volume. The polymerization process can also be carried out in the presence of a mobile catalyst. In this type of operation the catalyst concentration in the reaction zone is usually maintained between about 0.01 and about 10 percent by weight and the feed residence time can be from 10 minutes or less to 10 hours or more.

A preferred polymerization method is described in detail in a copending application of Hogan and Banks, Serial No. 573,877, filed March 26, 1956, now U.S. Patent 2,825,721. This particular method utilizes a chromium oxide catalyst containing hexavalent chromium, with silica, alumina, silica-alumina, zirconia, thoria, etc. In one embodiment of this application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

The solvent or diluent employed in the polymerization reaction includes in general, paraffins which dissolve the polymers at the temperature employed in the reaction zone. Among the more useful solvents are paraffins having between about 3 and 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used, however, in some instances they (or impurities therein) tend to shorten the catalyst life, therefore their use will depend on the importance of catalyst life. All of the foregoing and in addition, other hydrocarbon diluents which are relatively inert and in the liquid state at the reaction conditions may also be employed in carrying out the reaction of olefins to form solid polymers.

In carrying out the invention in one embodiment thereof a natural gasoline fraction containing mixed cyclic hydrocarbons contaminated with carbon tetrachloride and sulfur compounds is introduced to a fractionation zone wherein a major portion of the cyclohexane is separated as bottoms product and carbon tetrachloride passes overhead with lower boiling materials. The components which are present in the feed to the fractionation tower can comprise a relatively wide boiling range of materials, however, usually it is desirable that the material treated have a narrow boiling range, containing, for example, materials boiling between about 150° F. and about 200° F. A typical fraction having such a boiling range contains compounds, such as 2-methylhexane and 2,3-dimethylpentane, 1,1-dimethylcyclopentane, 3,3-dimethylpentane, etc. which are higher boiling than cyclohexane and 2,2,3-trimethylbutane, 2,4-dimethylpentane, 2,2-dimethylpentane, methylcyclopentane, benezene, 3-methylpentane, normal hexane, etc. which are lower boiling than cyclohexane. In addition, the fraction as stated, contains carbon tetrachloride and various types of sulfur compounds. Because of the closeness of the boiling range of the various compounds it has been found that in order to remove all of the carbon tetrachloride it is necessary in the fractionation zone to take overhead a product containing at least about 12 percent by volume of materials boiling above methylcyclopentane and including at least about 4.5 percent by volume of cyclohexane. To obtain this result a fractionation tower containing a large number of trays is necessary, namely about at least 50 trays and preferably at least about 100 trays. The fractionation can be carried out over a relatively wide range of pressure, for example, from 0 to 100 p.s.i.g. or higher. Corresponding temperatures to give a desired separation are in the range of between about 150° F. and about 290° F. The overhead from the fractionation zone can be further processed to recover methylcyclopentane and other components if desired. These materials find value in various uses, for example, methylcyclopentane can be utilized as a solvent or this material can be isomerized to cyclohexane.

The bottoms from the fractionation zone, which are substantially free from carbon tetrachloride, are passed through a treating step for removal of sulfur compounds. Various treating agents can be utilized for this purpose including sulfuric acid, hydrofluoric acid, aluminum chloride, clays, bauxite, etc. Because of the effect of sulfur compounds on the polymerization catalyst it is necessary to reduce the sulfur content of the cyclohexane product to a low value, usually to between not more than about 5 and about 20 parts per million. When using sulfuric acid as the treating agent, it has been found that in order to provide this reduction in sulfur content it is necessary to maintain the sulfuric acid strength in the treating zone over 70 percent by weight and preferably over 75 percent by weight. The treating process is usually carried out at normal atmospheric temperatures and pressures using one part of acid for 75 to 250 parts by weight of hydrocarbons.

Following desulfurization, the fractionation bottoms are passed through a conventional treatment for the removal of acid, such as for example through a caustic treater, after which this material is introduced to a second fractionation zone. In the latter zone, materials heavier than cyclohexane are removed as a bottoms stream and the desired cyclohexane product is taken overhead. To assure the desired purity of the overhead product it is necessary that this material contain not more than about 11 percent by volume of materials boiling below cyclohexane and not more than about 6 percent by volume of higher boiling components.

In order to more clearly describe the invention and provide a better understanding thereof, reference is had to the accompanying drawing which is a diagrammatic illustration of fractionating vessels and treating systems suitable for carrying out the invention. Referring to the drawing, a narrow boiling fraction of mixed cyclic compounds boiling between 150° F. and 200° F. is introduced to a demethylcyclopentanizer 4 wherein separation is effected between cyclohexane and the lighter materials in the feed. The overhead vapors from this tower, comprising methylcyclopentane and various dimethylpentanes with some cyclohexane, pass through conduit 6 and sodium sulfide treater 8 wherein hydrogen sulfide is removed, and then are introduced through conduit 10 to fractionator 12. The overhead from the fractionator, comprising essentially methylcyclopentane and lighter components, passes through conduit 14, condenser 16 and into accumulator 18. The material in the accumulator is withdrawn through pump 20 with a portion being returned to the fractionator as reflux through conduit 22 and the remainder being yielded through conduit 24. The various dimethylpentanes and cyclohexane which make up the bottoms product from the fractionator are yielded through conduit 26 and cooler 28.

The bottoms from the demethylcyclopentanizer 4, which are concentrated in cyclohexane, are substantially free from carbon tetrachloride, however, this stream still contains various sulfur containing compounds. To effect the removal of these compounds the bottoms product is withdrawn from the demethylcyclopentanizer through conduit 30, admixed with sulfuric acid from conduit 40 and introduced to treating vessel 32. The acid reacts to remove sulfur compounds and the hydrocarbon and acid are resolved into separate phases within this vessel. A weir is provided in the treating vessel and the hydrocarbon phase overflows this weir and is withdrawn through conduit 42. The acid phase is also withdrawn from the treater and is passed through conduit 36 and recycled to the bottoms stream as desired. Spent acid can be withdrawn from the system through conduit 34 and fresh make-up acid can be introduced through conduit 38. The acid-treated bottoms are passed through a second treating vessel 44 which contains a suitable basic material, such as caustic soda, which neutralizes any sulfuric acid associated with this stream. The desulfurized material again flows over a weir, leaving the caustic treater through conduit 54 and entering a second fractionator 56, which is designated as a deoiler. Caustic is removed from vessel 44 through pump 48 and recycled through conduit 52. Conduits 46 and 50 are provided for the removal of spent caustic and the addition of fresh caustic, respectively.

Within the deoiler 56 the desulfurized hydrocarbon stream is subjected to a further separation whereby heavy oils are removed from the cyclohexane. These oils pass from the deoiler bottom through conduit 70 and cooler 72. The overhead from the deoiler, comprising principally cyclohexane, with a small quantity of lower and higher boiling materials is removed through conduit 58 and condenser 60 and passes to accumulator 62. The accumulated material is withdrawn through pump 64 with a portion being returned to the deoiler through conduit 66 as reflux and the remainder being passed from the unit through conduit 68. As desired the cyclohexane product can be utilized as a solvent, as an intermediate in various chemical reactions or for any other appropriate use. Preferably, the material obtained in this specific operation is utilized as a solvent and diluent in polymerization of olefins in the presence of a chromium oxide catalyst, containing hexavalent chromium, associated with a supporting material.

The preceding discussion has been directed to a preferred embodiment of the invention, however this is not intended in any limiting sense but is merely illustrative of the invention, which broadly comprises recovering and purifying cyclohexane from a hydrocarbon mixture.

The following data is presented in illustration of a commercial application of the invention.

EXAMPLE

The following tests were made in a commercial unit similar to the unit illustrated in the aforedescribed drawing. In each operation the feed material comprised a narrow boiling range fraction from a natural gasoline containing materials between about 150° F. and about 200° F. The acid used in each case was 93% fresh acid. The results of a series of operations carried out on different days are set forth in Tables I through III.

*Table I*

| Volumes, g.p.d. | Fractionator (4) | | | Deoiler (56) | | |
|---|---|---|---|---|---|---|
| | A | B | C | A | B | C |
| Feed | 107,000 | 107,000 | 97,000 | 70,000 | 72,000 | 65,000 |
| Reflux | 435,000 | 435,000 | 435,000 | 140,000 | 144,000 | 144,000 |
| Bottoms Product | 73,000 | 72,000 | 65,000 | 4,000 | 53,000 | 3,000 |
| Overhead Product | 34,000 | 35,000 | 32,000 | 66,000 | 67,000 | 62,000 |
| Temperatures, °F.: | | | | | | |
| Bottom | 279 | 279 | 280 | 275 | 273 | 272 |
| Feed | 257 | 258 | 258 | 250 | 250 | 249 |
| Accumulator | 151 | 150 | 153 | 118 | 119 | 124 |
| Top | 238 | 238 | 239 | 251 | 250 | 250 |
| Pressure, p.s.i.g.: | | | | | | |
| Top | 40 | 40 | 40 | 19 | 19 | 19 |
| Accumulator | 13 | 13 | 13 | 10 | 10 | 10 |
| Bottom | 47 | 47 | 47 | 25 | 25 | 25 |

Table I above presents representative feed rates and operating conditions for three different commercial runs. In Table II are presented pertinent data relating to the composition of the fractionator overhead product and deoiler overhead product and data on the polymerization reaction rate obtained when polymerizing ethylene in the presence of the deoiler overhead product and chromium oxide catalyst, containing hexavalent chromium, associated with a supporting material. Referring to Table II it is to be noted that when the overhead product from the fractionator contains less than about 12 percent of materials boiling above methylcyclopentane, or when the cyclohexane content of the fractionator overhead product is less than about 4.5 percent, or when the deoiler overhead product contains more than about 11 volume percent of materials boiling below cyclohexane that the polymerization reaction rate is lower than 150 lbs./hr.

Table III presents a relationship between polymerization reaction rate and acid concentration in the treater. It is to be noted that the reaction rate with an acid concentration of 69 weight percent is 0. It is also to be noted that high reaction rates are obtained in the range of 74 to 93 percent acid by weight.

*Table II*

| Run No. | Fractionator (4) OHP [c] | | Polymerization [e] | Deoiler (56) OHP | |
|---|---|---|---|---|---|
| | High Boiling [d] Impurities, LV percent | Cyclohexane Content, LV percent | Reaction Rate, lb./hr. | Sulfur [a] Content, p.p.m. | Low Boiling [b] Impurities, LV percent |
| 1 | 10.7 | 3.0 | 136 | 9 | 12.0 |
| 2 | 10.1 | 2.1 | 12 | 17 | 12.0 |
| 3 | 11.7 | 4.7 | 0 | 12 | 12.6 |
| 4 | 13.2 | 6.3 | 40 | 18 | 10.3 |
| 5 | 15.6 | 7.6 | 138 | 8 | 10.7 |
| 6 | 11.2 | 3.2 | 134 | 12 | 10.9 |
| 7 | 11.2 | 3.2 | 150 | 7 | 11.4 |
| 8 | 16.0 | 8.3 | 194 | 7 | 10.5 |
| 9 | 16.0 | 8.3 | 230 | 7 | 9.2 |
| 10 | 16.6 | 8.7 | 243 | 12 | 11.0 |
| 11 | 12.1 | 5.0 | 280 | 7 | 10.2 |
| 12 | 13.3 | 4.6 | 297 | 7 | 9.6 |
| 13 | 13.0 | 5.9 | 250 | 11 | 10.5 |
| 14 | 13.8 | 4.9 | 278 | 11 | 10.3 |

[a] Turbidimetric analysis.
[b] Lighter than cyclohexane.
[c] Samples obtained one day in advance of corresponding deoiler samples to allow for residence time in system.
[d] Heavier than methylcyclopentane.
[e] Ethylene polymerized in the presence of a catalyst comprising 2.5 percent by weight of chromium as chromium oxide, containing 2.2 percent by weight hexavalent chromium, with silica-alumina prepared by impregnating particulate silica-alumina (10:90) with a solution of chromium oxide followed by drying and activation in air at gradually increasing temperatures up to 95° F., under the following conditions:

Ethylene feed rate _____ 160,000 lb./hr.
Cyclohexane feed rate _____ 950,000 lb./hr.
Polymer concentration in reactor _____ 8.0 wt. percent.
Catalyst concentration in reactor _____ 0.5 wt. percent.
Pressure _____ 420 p.s.i.g.
Temperature _____ 290° F.

*Table III*

| Run | Acid Concentration in Treater, wt. percent $H_2SO_4$ | Sulfur Content of [a] Fractionator (4) OHP p.p.m. | Reaction Rate, lb./hr. |
|---|---|---|---|
| 1 | 69 | 54 | 0 |
| 2 | 74 | 12 | 242 |
| 3 | 79 | 7 | 232 |
| 4 | 84 | 8 | 252 |
| 5 | 92.7 | 11 | 250 |

[a] Turbidimetric analysis.

Having thus described the invention by providing a specific example thereof, it is to be understood that no undue limitations or restrictionns are to be drawn by reason thereof and that many variations and modifications are within the scope of the invention.

I claim:

1. A process for recovering cyclohexane from gasoline containing carbon tetrachloride and sulfur compounds as impurities which comprises separating from said gasoline a narrow boiling range fraction of mixed cyclic hydrocarbons containing cyclohexane and said impurities, introducing said fraction to a first fractionation zone, taking overhead from said zone a fraction containing at least about 12 volume percent of material boiling above methylcyclopentane including at least about 4.5 volume percent cyclohexane and carbon tetrachloride, treating the bottoms from the fractionation zone with sulfuric acid, introducing the treated material to a second fractionation zone wherein heavier components are separated from the cyclohexane and recovering from said second zone an overhead product containing not more than 11 volume percent of materials boiling below cyclohexane and not more than about 6 volume percent of materials boiling above cyclohexane.

2. The process of claim 1 in which the bottoms from the first fractionation zone are treated with sulfuric acid having a concentration of at least 70 percent.

3. A process for recovering cyclohexane from a narrow boiling range fraction of mixed cyclic hydrocarbons containing carbon tetrachloride and sulfur compounds as impurities which comprises introducing said fraction to a first fractionation zone, taking overhead from said zone a fraction containing at least about 12 volume percent of material boiling above methylcyclopentane including at least about 4.5 volume percent cyclohexane and carbon tetrachloride, treating the bottoms from the fractionation zone with sulfuric acid, introducing the treated material to a second fractionation zone wherein heavier components are separated from the cyclohexane and recovering from said second zone an overhead product containing not more than 11 volume percent of materials boiling below cyclohexane and not more than about 6 volume percent of materials boiling above cyclohexane.

4. A process for recovering cyclohexane from a hydrocarbon fraction containing carbon tetrachloride and sulfur compounds as impurities which comprises separating from said hydrocarbon fraction a narrow boiling fraction of mixed cyclic hydrocarbons containing cyclohexane and said impurities, introducing said fraction to a first fractionation zone, taking overhead from said zone carbon tetrachloride, a portion of the cyclohexane and components boiling lower than cyclohexane, said overhead containing at least about 12 volume percent of compounds boiling above methylcyclopentane, including at least about 4.5 volume percent cyclohexane, treating the bottoms from the fractionation zone with a treating agent to remove sulfur compounds, introducing the treated material to a second fractionation zone wherein components boiling higher than cyclohexane are separated from the cyclohexane and recovering from said second zone an overhead product concentrated in cyclohexane.

5. The process of claim 4 in which the bottoms from the first fractionation zone are treated with sulfuric acid having a concentration of at least 70 percent.

6. A process for recovering cyclohexane from a hydrocarbon fraction containing carbon tetrachloride and sulfur compounds as impurities which comprises separating from said hydrocarbon fraction a narrow boiling fraction of mixed cyclic hydrocarbons containing cyclohexane and said impurities, introducing said fraction to a first fractionation zone, taking overhead from said zone carbon tetrachloride, a portion of the cyclohexane and components boiling lower than cyclohexane, treating the bottoms from the fractionation zone with a treating agent to remove sulfur compounds, introducing the treated material to a second fractionation zone wherein components boiling higher than cyclohexane are separated from the cyclohexane, and recovering from said second zone an overhead product concentrated in cyclohexane, containing not more than about 11 volume percent of lower boiling materials and not more than about 6 volume percent of materials boiling above cyclohexane.

7. The process of claim 6 in which the bottoms from the first fractionation zone are treated with sulfuric acid having a concentration of at least 70 percent.

References Cited in the file of this patent

UNITED STATES PATENTS

| | | |
|---|---|---|
| 1,858,394 | Diggs et al. | May 17, 1932 |
| 1,869,781 | Shiffler et al. | Aug. 2, 1932 |
| 2,382,446 | Ross et al. | Aug. 14, 1945 |
| 2,540,318 | Birch et al. | Feb. 6, 1951 |
| 2,707,197 | Souillard | Apr. 6, 1955 |
| 2,761,888 | Horeczy et al. | Sept. 4, 1956 |